Patented Mar. 27, 1923.

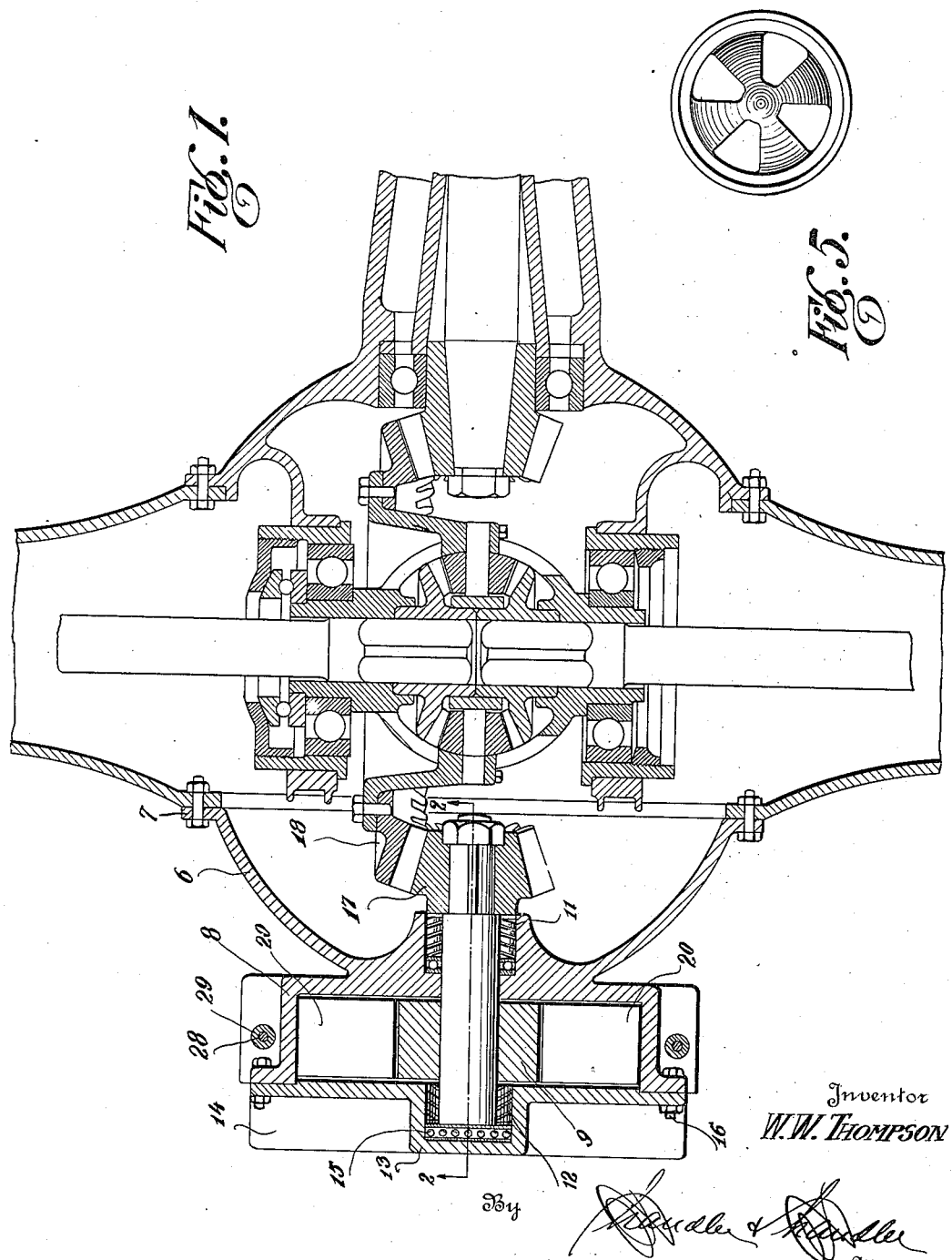

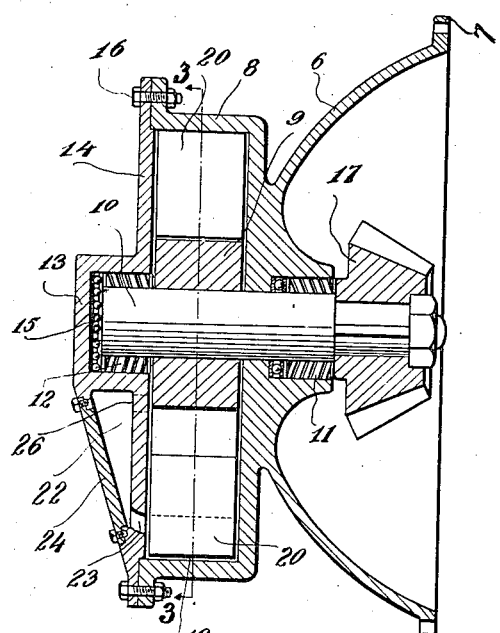

1,449,562

UNITED STATES PATENT OFFICE.

WINFIELD W. THOMPSON, OF GREENBANK, WEST VIRGINIA.

HYDRAULIC BRAKE.

Application filed October 4, 1920. Serial No. 414,586.

*To all whom it may concern:*

Be it known that I, WINFIELD W. THOMPSON, a citizen of the United States, residing at Greenbank, in the county of Pocahontas, State of West Virginia, have invented certain new and useful Improvements in Hydraulic Brakes; and I do hereby declare the following to be a full, clear, and exact description of the invention, such as will enable others skilled in the art to which it appertains to make and use the same.

This invention relates to hydraulic brakes, and is particularly adaptable to motor vehicles.

The invention aims primarily to provide the brake of simple construction and of easy application to any mechanism employing power gears or similar mechanism, which may be conveniently and quickly actuated so as to retard the speed of the machine with which it is used, to gradually or abruptly, as desired, lock the mechanism against movement, which is capable of permitting the mechanism to travel at an exceedingly low degree of speed without damage or injury to the gearing or machinery, which is operable in such manner as to prevent a gear or system of gears operating in one direction and yet permitting them to freely rotate and function in a reverse direction.

A further object is to provide a brake of the character stated adaptable particularly to the differential gearing of a vehicle or other machine, which involves no change in the construction or make up of such vehicle or machine, which does not in any way affect or interfere with the operation of brakes of the now generally used type with which the machine may be equipped, and which has its various parts so constructed and assembled as to minimize the opportunity for wear, breakage or derangement.

These objects, as well as other which will appear as the description proceeds, are attained by the use of the mechanism hereafter described and claimed and illustrated in the accompanying drawings, and wherein the preferred embodiment only of the invention is disclosed.

In the drawing:

Fig. 1 is a sectional view taken through a transmisson housing of conventional form and illustrating the application thereto of a brake constructed in accordance with the invention, Fig. 2 is a sectional view taken substantially on line 2—2 of Fig. 1, Fig. 3 is a sectional view taken upon line 3—3 of Fig. 2, Fig. 4 is an enlarged detail view of one of the fluid control valves, and Fig. 5 is a horizontal view of the improved valve.

As the invention is designed particularly, though not exclusively, to use in connection with the power mechanism of motor vehicles, the device is arranged and constructed in such manner as to be easily and quickly applicable thereto without resorting to any change whatever in the construction and operation of the power transmission mechanism of the vehicle, or any other standard parts of the latter itself. The device is preferably applied to the differential mechanism, being in connection with any one of the gears thereof, and in order that the device may be readily adaptable to such part of the mechanism, it is constructed in connection with a plate to take the place of the now commonly used cover plate for the differential mechanism.

In the drawing 6 indicates the element which may be referred to as the cover plate, being of substantially semi-spherical shape and open at its larger end, the edges of the plate at said end providing an out turned flange 7 having openings therein as shown to aline with the openings surrounding the aperture in the differential casing. This plate will be made to conform to the size and shape of the opening in the differential housing, as will be understood.

The rear or smaller end of the plate is provided with a casing 8 confining the rotor 9 which constitutes the brake element of the device. The casing 8 is of substantially annular shape and has extending therethrough a shaft 10 arranged in suitable bearings 11 in the plate 6. The shaft 10 extends into the casing near the middle portion thereof but eccentric to the same, and the rotor 9 is keyed to the shaft as shown. The outer end of the shaft is journaled in bearings 12 in pocket 13 provided in cover plate or head 14, and thrust bearings 15 may also be provided in the said pocket, for purposes which will be readily understood. The head 14 covers the outer end of casing 8, and is removably secured thereto by bolts 16.

The inner end of shaft 10 has splined thereto a beveled pinion 17 to mesh with one of the rim gears 18 of the differential mechanism. It will be obvious, from the description so far given, that when the cover plate 6 is properly applied to the differential housing with the beveled pinion 17 meshing with a gear of the differential mechanism, the housing will be securely closed and rendered dust and moisture proof. Operation of the differential gearing will at once cause shaft 10 to rotate, the direction of rotation, of course, depending upon the direction of movement of the rim gear with which the pinion is in mesh. The rotation of shaft 10 therefore causes rotor 9 to rotate within the casing 8.

As has been before stated, the shaft 10 enters casing 8 near the middle portion thereof but eccentric to the inner area of the said casing. The upper portion of the rotor, which is truly circular, snugly fits against the upper wall of the housing or casing 8, but the lower periphery of the rotor is spaced from the bottom portion of the casing, thereby providing a fluid space 19. This fluid space may be of relatively large area as shown, and is swept or traversed by the paddles, blades or plungers 20 arranged in the spaced radially disposed pockets 21 in the rotor. These blades are free to move outwardly or inwardly, their weight, together with the changing inclination of the pockets determining their direction of movement.

The head 14 is provided with a fluid reservoir 22, the latter being located preferably in the lower part of the head and being in communication with the lower portion of the fluid space 19 by means of ports 23. Fluid within the reservoir is therefore free to flow into the lower part of the fluid chamber. The interior of the fluid reservoir is accessible through an opening in the outer face of the head covered by the plate or lid 24.

Compression chambers 25 are provided either in the casing or in the cover plate, at substantially diametrically opposite points in the housing. These compression chambers comprise ports of substantially restricted nature communicating at their outer ends with the interior of the housing near the first points of contact of the rotor periphery with the upper wall of the annular casing. These compression chambers communicate with passages 26 which lead into the oil or fluid reservoir 22, and valves 27 control the flow of fluid either from the compression chamber to the passage, or vice versa.

A rotary valve is the type used in the present illustration, the degree of opening and closing of the communication between the chamber and passage being determined by the degree of rotary movement applied to stem 28 connected to the valve. This stem is rotatable in the stuffing box 29 and into the casing above the compression chamber, and the stuffing box may be provided with the packing nut 30 for purposes well known. The upper end of the stem has attached thereto an operating arm 31 which may be connected either directly to a suitable hand controlled mechanism in convenient reach of the operator of the machine or may be connected with the arm of the opposite valve stem by a suitable link, the latter being attached to the manual control means.

With the device applied in the manner above pointed out and power developed in the differential mechanism, the rotor 9 will turn within its casing. As the pockets 21 therein pass to downwardly and upwardly inclined positions the paddles or blades therein will gravitate to the outer ends of the pockets, engaging at their outer extremities against the eccentric lower wall of the rotor casing. These blades thus sweep the fluid space 19, and cause fluid entering said space through ports 23 to be moved in the direction of one of the compression chambers 25. As the fluid is thus lifted and forced into the chamber its degree of travel will be governed by the degree to which the valve has been opened, and the speed of the rotor will thus be governed. When the valve is full open, there is no resistance offered by the liquid, as the compression chamber and port is of ample size to accommodate rapid travel of the fluid. Should, however, the valve be partially closed, this liquid would be retarded in its passage from the compression chamber, and hence the rotation of the rotor 9 would be impeded. By reason of the fact that shaft 10 is geared to one of the gears of the differential mechanism, it is obvious that the retarded movement of the rotor will act as a brake to the differential mechanism. In the event that the valve towards which the fluid is being forced by the blades is entirely closed, no seepage of fluid will be permitted, and therefore the rotor will be held against rotation.

The characteristics of the invention are set forth herein as applied to only one type of mechanism. It will be understood, however, that its use is by no means so restricted as it may with equal efficiency and advantageous results be used in connection with other power mechanisms. Furthermore, the invention is not to be restricted to the detailed construction herein dwelt upon, as variations in the details and general arrangement of parts may be freely resorted to without departing from the spirit of the invention as defined by the claims.

What is claimed is:

1. An hydraulic brake including a casing, an eccentrically mounted rotor within the casing, the casing having a fluid chamber communicating with the casing below the rotor, the casing having fluid passages between the chamber and the casing above the first-named communication, and means in said passages for controlling the flow of the fluid therethrough.

2. An hydraulic brake including a casing, a rotor eccentrically mounted in the casing, the casing having a fluid chamber disposed below and outwardly of the axis of the rotor, the lower portion of the chamber having communication with the casing below the rotor, the casing having passages at opposite sides thereof at points slightly below the axis of the rotor and communicating with the upper portion of said chamber, and controlling valves in said passages for controlling the flow of fluid between the casing and chamber.

In testimony whereof, I affix my signature, in the presence of two witnesses.

WINFIELD W. THOMPSON.

Witnesses:
O. W. RUCKMAN,
R. J. ARBOGAST.